United States Patent [19]

Long et al.

[11] 4,040,046
[45] Aug. 2, 1977

[54] REMOTE DATA READOUT SYSTEM FOR TRANSMITTING DIGITAL DATA OVER EXISTING ELECTRICAL POWER LINES

[75] Inventors: George Long; Dennis J. Martell, both of Naperville; James E. Batz, Northbrook, all of Ill.

[73] Assignee: Northern Illinois Gas Company, Aurora, Ill.

[21] Appl. No.: 586,997

[22] Filed: June 13, 1975

Related U.S. Application Data

[63] Continuation of Ser. No. 444,249, Feb. 20, 1974, which is a continuation-in-part of Ser. No. 208,318, Dec. 15, 1971, abandoned.

[51] Int. Cl.² .............................................. H04M 11/04
[52] U.S. Cl. ........................... 340/310 CP; 340/152 T; 340/310 A; 325/66
[58] Field of Search ......... 340/310 R, 310 A, 310 CP, 340/152 T

[56] References Cited

U.S. PATENT DOCUMENTS

| | | | |
|---|---|---|---|
| 3,656,112 | 4/1972 | Paull | 340/310 A |
| 3,689,886 | 9/1972 | Durkee | 340/310 A |
| 3,810,096 | 5/1974 | Kabat | 340/310 R |
| 3,818,481 | 6/1974 | Dorfman | 340/310 R |

*Primary Examiner*—Thomas B. Habecker
*Attorney, Agent, or Firm*—Johnson, Dienner, Emrich & Wagner

[57] ABSTRACT

A system for providing remote readout of a plurality of groups of data indicating devices including a control unit for each group of data indicating devices for receiving interrogate data signals transmitted over a communication line or RF signal link from an interrogate unit at a central location to the locations of the control units, and for transmitting the interrogate data to transponders associated with the indicating devices over existing electrical power lines to which the control unit and transponders are connected via existing electrical outlets. The transponders are responsive to the interrogate data to generate reply data representing the reading of an associated indicating device for transmission over the electrical power line to the control unit which effects the transmission of the reply data to the central location.

6 Claims, 9 Drawing Figures

REMOTE DATA READOUT SYSTEM FOR TRANSMITTING DIGITAL DATA OVER EXISTING ELECTRICAL POWER LINES

CROSS-REFERENCE TO RELATED APPLICATIONS

This application is a continuation of the copending U.S. application Ser. No. 444,249, filed Feb. 20, 1974, which is a continuation-in-part of the U.S. Pat. application, Ser. No. 208,318, filed Dec. 15, 1971, now abandoned.

BACKGROUND OF THE INVENTION

1. Field of the Invention

This invention relates to systems for providing remote readout of data indicating devices and, more particularly, to a remote reading system including apparatus for transmitting digital data from one location to another over existing electrical power lines.

2. Description of the Prior Art

Various systems have been proposed in the prior art for obtaining information from a plurality of remote sources. For example, remote reading systems have been employed to effect the readout of a plurality of utility meters from a central interrogation station which may be mobile or stationary.

In such systems, interrogate data signals generated at a central location are transmitted to a plurality of data indicating devices at locations remote from the central location to effect readout of information provided at such locations. Each data indicating device has associated therewith a transponder for receiving the interrogate data signals and for generating reply data signals representing the information provided by the indicating device for transmission back to the central location.

Some prior art remote reading systems employ RF communication links to enable the transmission of data between the central location and the transponders associated with indicating devices at the remote locations. Such systems require an RF signal antenna at the central location as well as at the location of the transponders at the remote locations. Since the indicating devices being read out are generally located within a building, the signal antennas at such remote locations must be located outside the buildings to enable reception of interrogate data signals transmitted from the central location and the transmission of reply data signals back to the central location. Accordingly, a separate signal line must be extended from the location of each transponder unit within the building to the location of the antenna at the outside of the building.

In other systems the interrogate data signals are transmitted over communication links established over a telephone line connected between the central location and the transponders at locations remote from the central location. However, such systems can be employed only where a telephone line is available at the location of the indicating device and associated transponder.

Thus, in either of these prior art systems, it is generally necessary to provide a separate data communication line between the locations of an indicating device in a building and a point in the building from which the data can be transmitted to a central interrogate station. In applications wherein a plurality of indicating devices are located at different locations within a given building, the requirement of providing the necessary data communication lines may add considerable cost to the system.

In another known system which employs electrical power lines for readout of data indicating devices, data indicating information provided by the data indicating devices is transmitted over the neutral conductor of the power lines. However, this system requires modification of the existing wiring system by severing of the neutral conductor at the location of each data indicating device to permit the insertion of a resonant circuit which isolates the neutral conductor from earth ground to enable transmission of data signals over the neutral conductor.

SUMMARY OF THE INVENTION

It is an object of the present invention to provide a system for effecting readout of data representing information on a plurality of register means associated with utility devices which permits the information to be transmitted from transponders associated with the register means to readout equipment at a central location over existing electrical power lines without modification of the existing wiring system.

It is another object of the present invention to provide a system for controlling the readout of a group of register means which may be at different locations within a given building complex, from a control transponder located at a predetermined location inside or outside of the building complex. It is a further object of the present invention to eliminate the need to provide separate data communication lines between the locations of the register means and the readout equipment within a given building complex.

A further object of the invention is to provide a remote readout system for a plurality of groups of register means wherein the readout of the groups of register means is controlled from an interrogate source which transmits address signals to a plurality of control transponders each individually associated with a different group of the register means.

In accordance with one embodiment of the invention, a remote readout system for a plurality of register means associated with a plurality of utility devices located within one or more building complexes includes a control transponder means for providng address signals for transmission over existing electrical power lines of the building complex to effect the readout of a selected one of the register means. Each register means has associated therewith an encoder means for converting information stored on the register means into binary coded signals and a data transponder means responsive to address signals provided by the control transponder to generate reply data signals coded to represent the reading data provided by the encoder means for transmission over the power lines to the control transponder.

The readout of a plurality of register means located within the same building complex is effected using the existing electrical power lines of such building complex as the data transmission link between the data transponder means and the control transponder means.

The address signals provided by the control transponder means are coupled over signal coupling means of the transponder means to the power lines and transmitted over the power lines to all of the data transponder means that are connected to the power lines. The address signals are coupled to the data transponder means over signal coupling means of the data transponder means and the reply data signals provided by each transponder means are coupled to the power lines and thus transmitted over the power lines back to the control transponder means.

The signal coupling means of the data transponder means is comprised of a signal coupling network and an electrical plug means which enables the data transponder means to be plugged into an existing electrical outlet of the electrical wiring system which is in close proximity to the register means. The signal coupling means of the control transponder means any also include electrical plug means to permit the control transponder means to be plugged into an electrical outlet of the electrical wiring system.

The readout of a plurality of groups of data register means may be controlled from a common location. Each group of data register means may be located in a different building complex and a separate control transponder means is provided for each building complex for receiving address signals transmitted to the location of the control transponder means at a given building complex from the common location. The address signals may be transmitted to the control transponder means of different building complexes over a communication line extending between an interrogate source at the common location and the control transponder means or over an RF transmission link established between the control transponder means and the interrogate source.

The data transponder means associated with each group of data register means are connected via plug means and electrical outlets to the power lines of the wiring system for the building complex in which the control transponder means and register means are located. The control transponder means, which may also be plugged into an electrical outlet, is operable to receive the address signals which may be multi-tone signals transmitted over a communication line or RF signals radiated from the interrogate source, which, for example, may comprise a mobile unit, and to convert such address signals into frequency signals from transmission over the existing electrical power lines to control the operation of the data transponder means connected to the power lines. The reply data provided by the data transponder means transmitted back to the control transponder means over the electrical power lines is converted to multi-tone signals or RF signals coded to represent the reply data to enable transmission of the reply data to the interrogate source.

Thus, reading data representing the readings of a plurality of register means, which may be at different locations within the same building complex, is transmitted over existing electrical power lines of the building to a control transponder means at a location in the building which is convenient to a communication line or the location of a signal antenna to enable the reading data from the plurality of indicating devices to be transmitted to the interrogate unit at the central location. By employing existing electrical power lines of the building and control and data transponders which plug into electrical outlets to transmit the reading data from a plurality of remote locations to the location of the control transponder, the system provided by the present invention has eliminated the need to extend signal conductors between the locations of the register means and the control transponder means. In addition, no alteration of the existing wiring is required.

In an exemplary embodiment, the system employs frequency modulation for data transmission to provide a high system signal-to-noise ratio in the presence of impulse noise signals on the power lines used to transmit readout data between the control transponder means and the data transponder means.

DESCRIPTION OF A PREFERRED EMBODIMENT

General Description

Figure 1:
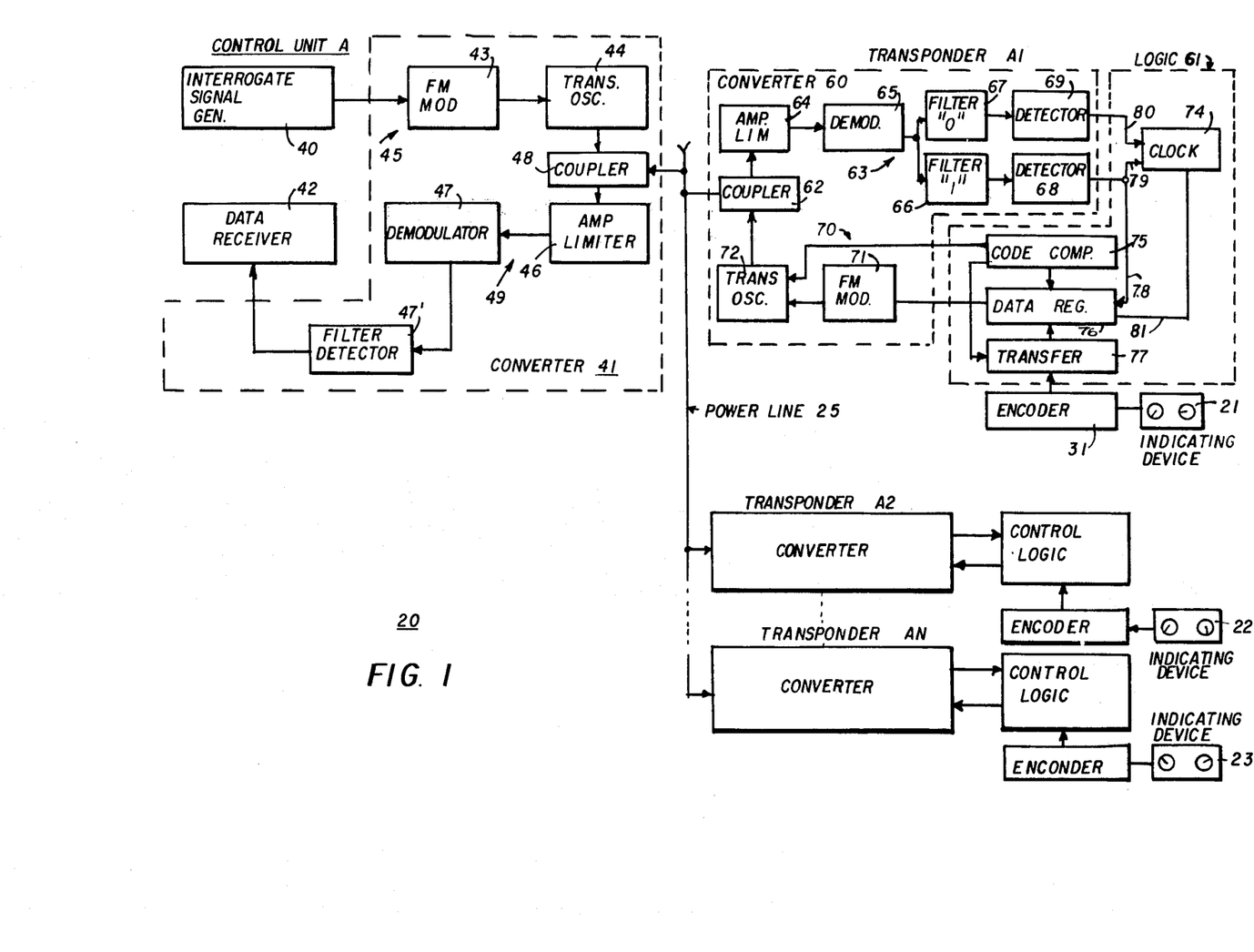
FIG. 1 is a block diagram of a system for providing readout of a plurality of indicating devices at different locations from a control unit at a location remote from the locations of the indicating devices wherein digital data is transmitted between the locations of the indicating devices and the control unit over existing electrical power lines.

Referring to FIG. 1, there is shown a block diagram of a system 20 for controlling the readout of a plurality of indicating devices 21-23 from a central location. The system includes a control transponder unit A at the central location and a plurality of data transponders including data transponders A1, A2, . . . AN shown in FIG. 1, each individually associated with a different one of the indicating devices 21-23.

The data indicating devices 21-23 may be register counters of utility devices such as business machines, copying machines, multi-dial registers of utility meters, which indicate an amount of a commodity used, or any type of storage or registering device used to accumulate data over a period of time and which must be read out periodically for billing or other purposes.

The system 20 is operable to effect periodic readout of register counters of a plurality of such utility devices. Each register counter, such as register counter 21, has an encoder, such as encoder 31, associated therewith for converting dial readings of the register 21 into logic level data signals. The encoder is capable of providing a set of binary coded words which represent the current reading of the indicating device 21.

Figure 5:
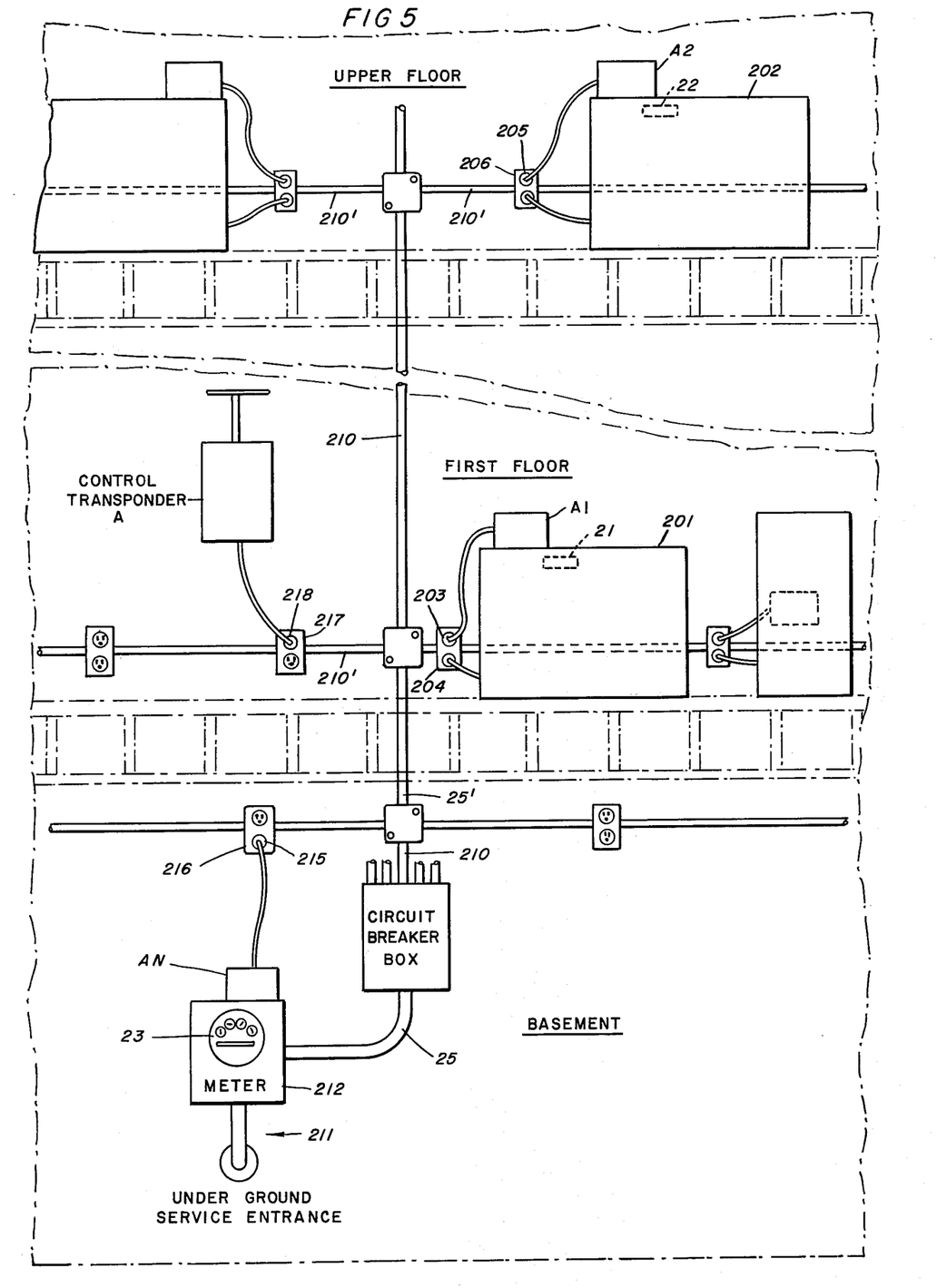
FIG. 5 is a view of a portion of a building illustrating data transponders and associated utility devices and a control transponder which are plugged into electrical outlets of the building wiring system to enable data transmission therebetween over electrical power lines of the building; and, FIG. 6-8 are schematic circuit diagrams of further signal coupling networks for the system shown in FIG. 1.

Referring to FIG. 5, the remote meter reading system 20 may be employed to effect the readout of mechanical registers, or the like, or a plurality of such utility devices which are located within the same building complex. A building complex may comprise a single building or a plurality of buildings which employ a common electrical wiring system.

As shown in FIG. 5, indicating devices 21 and 22 may be mechanical counters of copying machines 201 and 202, respectively. The indicating device 23 may be the dial register of a watt hour meter 212. The readout of all such registers within the building complex is effected using existing electrical power lines 25 of a building as a data transmission medium between the control transponder A and the data transponders A1, A2, AN. The electrical power is supplied to the building complex via a service entrance, indicated generally at 211, at which is located the watt hour meter 212 and a circuit breaker box 213 from which extends a plurality of separate branch power lines, including power line 25', over conduits, such as conduit 210. The branch line 25' within conduit 210 extends via conduit 210 from the circuit breaker box 213 to each of the floors of the building. Branch circuits of the line 25' are extended over conduits 210' for each floor to provide electrical outlets, such as outlets 204 and 206 for providing power to utility devices, such as copying machines 201 and 202.

In accordance with the present invention, each of the data transponders, such as data transponder A1 associated with mechanical register 21, includes an electrical plug 203 which enables the data transponder A1 to be plugged into an existing electrical outlet 204, located in the proximity of the copying machine 201 and which is connected to the power line 25'.

Similarly, data transponders A2 and AN each have electrical plugs 205 and 215 respectively, which enable the data transponders A2 and AN to be plugged into electrical outlets 206 and 216 of the electrical wiring system. The data transponder AN enables readout of the dial 23 of the watt hour meter 212 to permit readout of the usage of electrical power for the building.

The control transponder A provides address signals for effecting the readout of the selective one of the indicating devices 21-23 and the data transponder A1, A2, AN corresponding to the address provided is operable to provide reply data signals representing the reading of the selected indicating device. The address data provided by the control transponder A and the replay data provided by the data transponders A1, A2, AN are transmitted over the power line 25. The control transponder A may be connected to the power line 25 via an outlet 217 and a plug 218. Alternatively, the control transponder may be hard wired into the electrical system inasmuch as the control transponder A is generally located at a point in the building which is more accessible to the power line 25. In the exemplary embodiment, shown in FIG. 5, the control transponder A is located remotely from the service entrance and accordingly the control transponder A is shown connected to the power line branch 25' via plug 218 and electrical outlet 217. As is described hereinafter, a signal coupling network may be employed to permit coupling between the power line branches for signal transmission purposes while providing isolation between the branch lines for power signals carried thereon.

Alternatively, the control transponder A may be located near the service entrance 211 and hard wired to the power line 25 at the input of the circuit breaker box 213 such that the address signals provided by the control transponder A are transmitted over all of the separate branch lines, such as line 25'. The control transponder A may also be located outside of the building complex.

Accordingly, the address signals provided by the control transponder A are coupled to the power line 25 and transmitted over the power line to the locations of all the data transponders A1-AN associated with register devices 21-23, which are plugged into electrical outlets in the vicinity of the utility devices with which the data transponders are associated.

The reply data signals provided by the addressed data transponder are extended to the power line 25 over the associated plug and outlet and transmitted over the power line 25 to the location of the control transponder A which receives the reply data signals.

Since the control unit A controls the readout of a plurality of data indicating devices, such as indicating devices 21-23 shown in FIG. 1, each indicating device is assigned a multi-digit identification number or select code that is unique to that indicating device. The number of digits of the select codes is sufficiently large to enable a unique select code to be provided for each data indicating device to be read out under the control of the control unit A.

In a simplified illustration used to illustrate the operation of the system, each indicating device is assigned a different two digit select code. For example, indicating device 21 has been assigned select code 95, and indicating devices 22, 23 have been assigned select codes 96, 97, respectively. It is pointed out that while only three data indicating devices 21-23 are shown controlled by control unit A, this is for purposes of simplifying the discussion and any number of such devices can be controlled by a common control unit, such as control unit A.

Control Unit

The control unit A includes an interrogate signal generator 40, a converter 41, and a data receiver 42. The interrogate signal generator 40 provides logic level data signals representing the coding for the address of an indicating device to be read out. Thus, to select indicating device 21, the interrogate signal generator 40 provides an eight bit binary coded word representing the binary coding for the address 95 of the indicating device 21.

The converter 41 converts the data level signals provided by the interrogate signal generator 40 into frequency modulated signals for enabling the transmission of the select data to the transponders A1, A2, AN over the power line 25.

The converter 41 comprises a transmit section 45 including an FM modulator circuit 43 and a transmitter oscillator circuit a receive section 49 including an amplifier limiter circuit 46 and a demodulator circuit 47, and a signal coupling network 48 which couples the output of the transmitter 44 and the input of the amplifier limiter circuit 46 to the power line 25. The signal coupling network 48 also serves to isolate the transmit section 45 from the receive section 49 of the converter 41.

The eight data bits provided by the interrogate signal generator 40 selectively energize the frequency modulator circuit 43 of the converter 41 which generates modulating signals of frequencies $Fa$ and $Fb$, which may be 2KHz and 3KHz, respectively. Thus, a tone burst of frequency $Fa$ is generated responsive to each logic 1 level bit and a tone burst of frequency $Fb$ is generated responsive to each logic 0 level bit. The sequence of tone bursts $Fa$, $Fb$ generated by the frequency modulator 43 are used to modulate a carrier signal $F1$, which may be 450 KHz, generated by the transmitter oscillator circuit 44 of the converter 41.

Frequency modulation is used for data transmission in the present system to provide a high signal-to-noise ratio in the presence of impulse noise signals which may be present on the power line 25 in addition to the 60 Hz, 120 VAC signals normally present on the power line 25.

Figure 2:
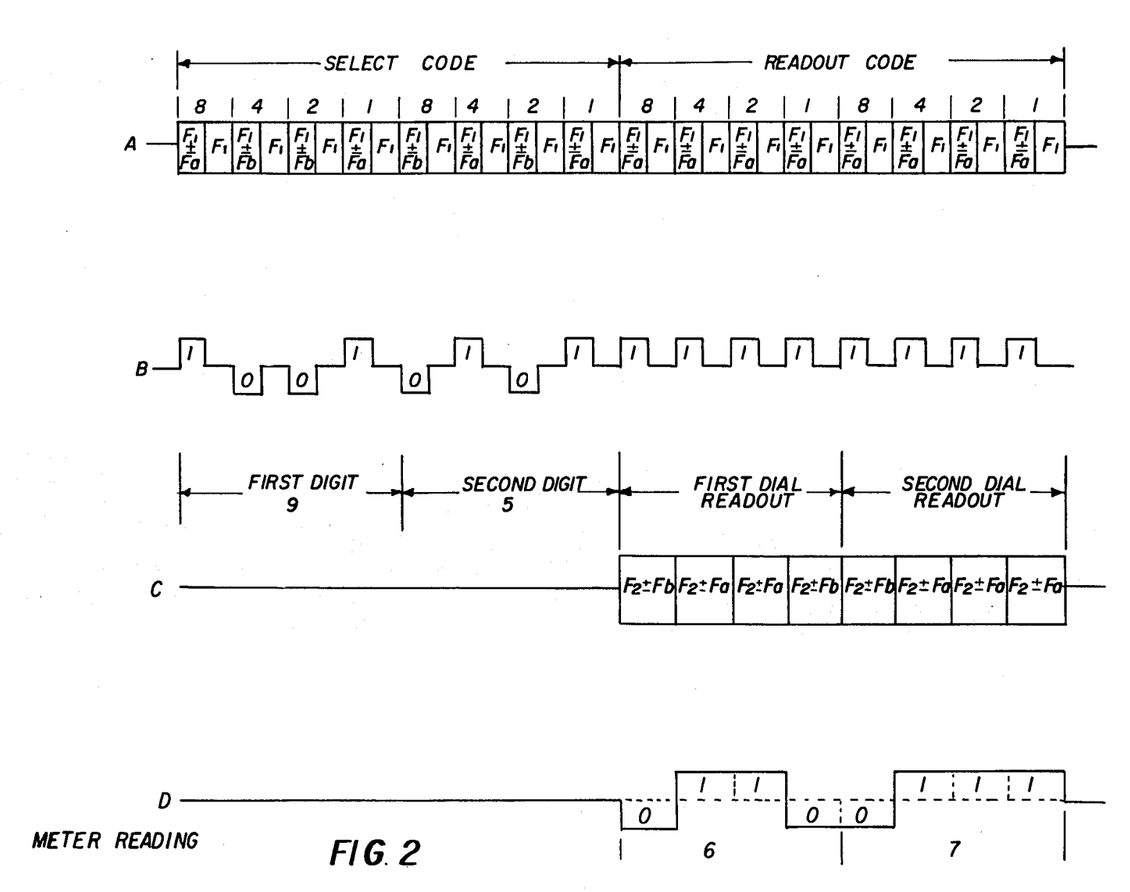
FIG. 2 is a timing chart illustrating a readout cycle for the system shown in FIG. 1.

Thus, in the present example, to effect readout of indicating device 21, the output of the transmitter oscillator 44 will be as shown in line A of FIG. 2. The carrier frequency F1 is shown to be modulated by tone outputs of the modulator circuit 43 to provide signals of a frequency F1 ± Fa to indicate each logic 1 level and signals of a frequency F1 ± Fb to indicate each logic 0 level. The series of frequency modulated signals thus provided by the transmitter 44 represent the binary coding for the address 95 of indicating device 21.

The frequency modulated carrier signals thus provided are coupled to the power line 25 over the signal coupling network 48 for transmission over the power line 25 to the transponders A1, A2, AN, at the remote locations.

Figure 3:
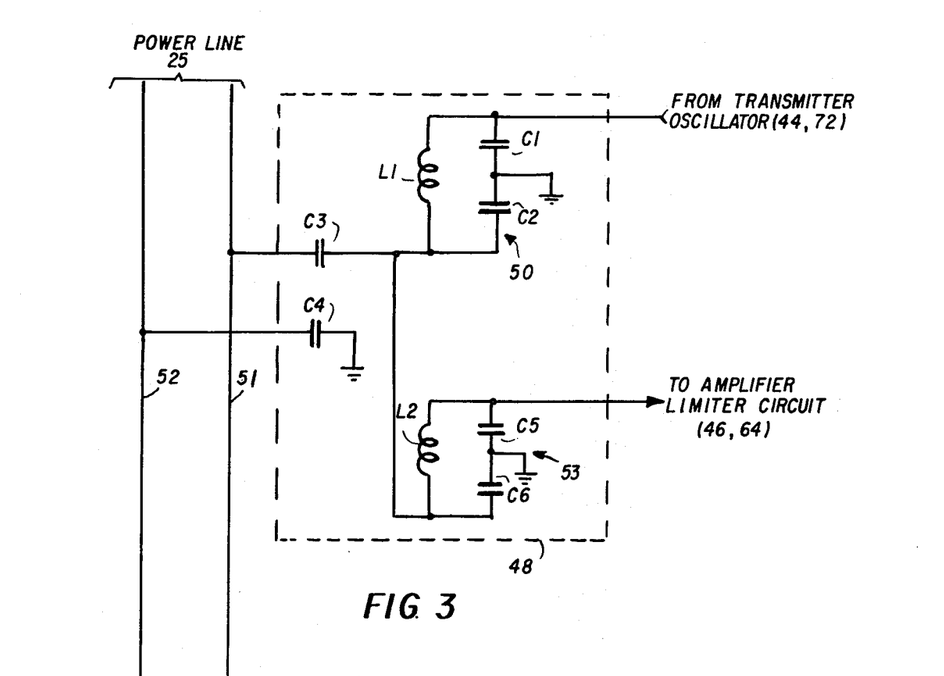
FIG. 3 is a schematic circuit diagram of a signal coupling network for connecting a control unit and a plurality of transponders of the system shown in FIG. 1 to a common electrical power line.

In accordance with one embodiment, the signal coupling network 48 is shown in FIG. 3 to include a first bandpass filter network 50 having an inductor L1 and a pair of capacitors C1, C2, connected between the output of the transmitter oscillator 44 of the transmit section 45 of the converter 41 and a conductor 51 of the power line 25 over a capacitor C3. A second conductor 52 of the power line 25 is connected over a capacitor C4 to a point of reference potential or ground for the circuits of the converter 41.

The signal coupling network 48 further includes a second bandpass filter network 53 including an inductor L2 and a pair of capacitors C5, C6 connected between the input of the amplifier limiter circuit 46 of the receive section 49 of the converter 41 and the power line conductor 51 over capacitor C3. While in one embodiment the bandpass networks 50 and 53 are shown to be P$i$ filter networks, it is apparent that other types of bandpass filter networks could also be used.

The network 50 is tuned to a center frequency of approximately 450 KHz, the frequency of the transmitter oscillator circuit 44. Thus, the frequency modulated signals generated by the transmitter oscillator 44 will be coupled to the power line 25 over the network 50 and capacitor C3.

In accordance with an exemplary embodiment, the remote reading system 20 employs full duplex operation to enable simultaneous transmission and reception of data signals between the control unit A and the transponders A1, A2 . . . , AN at the remote location. Accordingly, as will be shown hereinafter, the transponders A1, A2 . . . , AN generate reply data at a frequency F2, which may be 500 KHz.

Therefore, the bandpass filter network 53 connected to the receive section 49 of the converter 41 is tuned to a center frequency of approximately 500 KHz to enable reply data signals present on the power line 25 to be coupled to the receive section 49 of the converter 41. The bandpass characteristics of the filter networks 50 and 53 provide isolation between the transmit and receive sections of the converter 41. The coupling capacitors C3 and C4 block the 60 Hz AC power signals on power line 25 from entering the converter 41, but allow the 450 KHz signals to be coupled from the transmitter 45 to the power line 25 and the 500 KHz signals to be coupled from the power line 25 to the receiver 49.

It is pointed out that half-duplex operation could also be used in the remote meter reading system provided by the present invention. In such case, the transmitter 44 of the control unit A and the transmitter 72 of the transponder A1, for example, would provide carrier signals of the same frequency. A clock pulse generator circuit, deriving its sync from incoming data signals would alternate the transmit and receive functions of the control unit A and the transponders A1, A2, AN, and thus, the isolation filters 50, 53 of the coupling networks 48, 62 would not be required.

Figure 6:
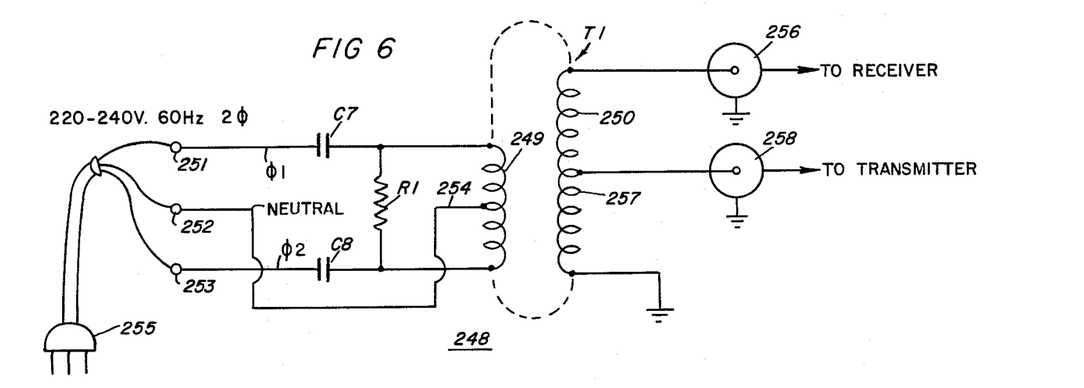

A preferred embodiment for the signal coupling network 62 is shown in FIG. 6. The coupling network 248 includes a transformer T1 having windings 249 and 250. Winding 249 is connected over filter capacitors C7 and C8 to output terminals 251 and 252 of the network 248. A resistor R1 is connected in parallel with winding 249. A center tap 254 of the winding 249 is connected to a further output terminal 253 of the network. Terminals 251-253 are in turn connected to an electrical plug 255 which enables the signal coupling network 248 to be plugged into an existing electrical outlet for connection to the power line 25 which for a two phase 60 Hz system includes a pair of phase conductors 01 and 02 and a neutral conductor N.

The winding 250 is connected to a plug 256 for connection to the input to a receiver, which may be the limiter circuit 46 of converter 41 (FIG. 1) or the limiter circuit 64 of transponder A1, for example. A center tap 257 of winding 250 is connected to a plug 258 for connection to the output of the transmitter, which may be oscillator 44 of converter 41 or oscillator 72 of converter 60, for example.

The transformer T1 serves as a step-down transformer between the transmitter output to match the low impedance presented by the two phase 60 Hz power line 25. In the reverse direction, transformer T1 provides a voltage step-up to the receiver to match the low impedance of the receiver to the low impedance of the power line 25. Capacitors C7 and C8 block the 60 Hz AC power signals on the power line 25 from entering the converter 41 or the converter 60.

Figures 7, 8:
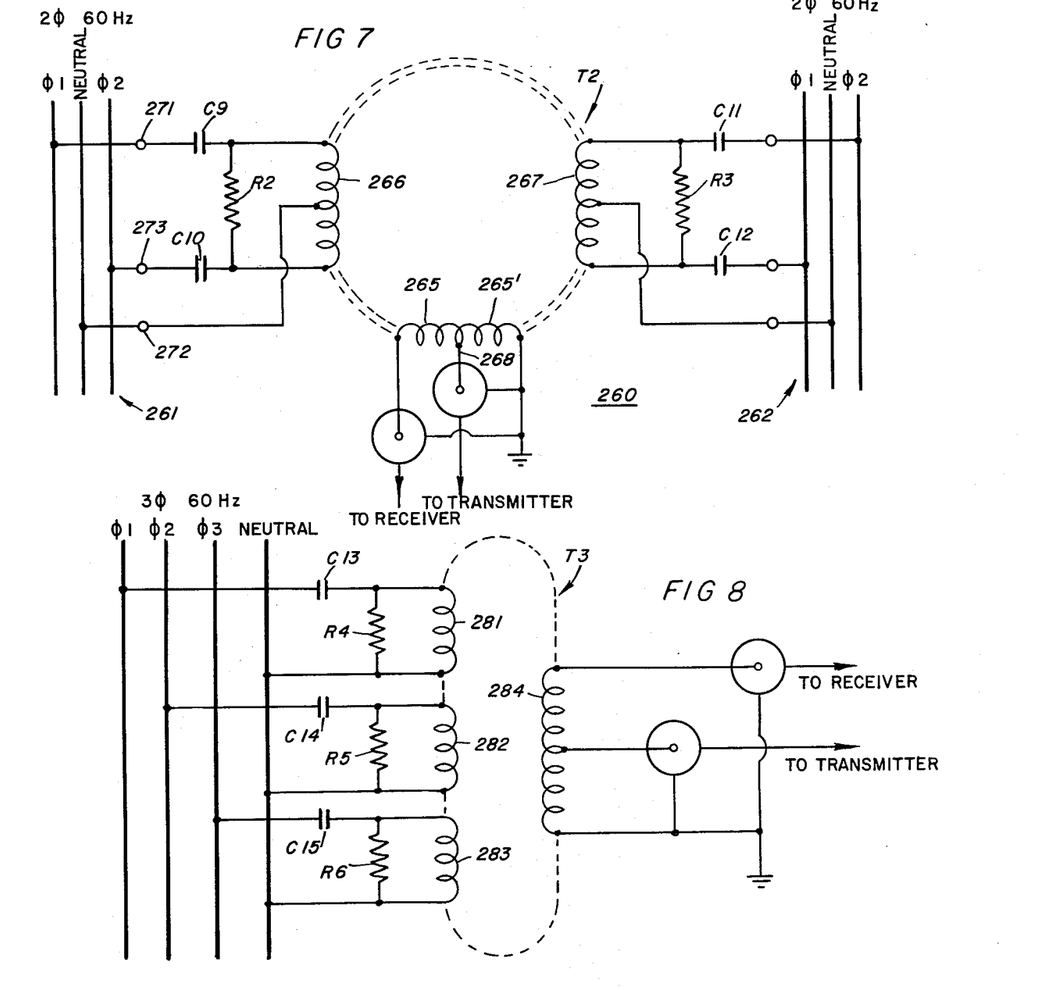

Referring to FIG. 7, there is shown a further signal coupling network 260 which may be employed when separate wiring systems are provided for a given building. For example, one set of power lines 261 may be provided for the lower floor of the building and separate lines 262 may be provided for upper floors of the building. Certain ones of the data transponder units A1, A2, AN may be connected via outlets to the lines 261 whereas other ones of the data transponder units may be connected via outlets to lines 262.

The control transponder converter 41 has its output coupled over the coupling network 260 to the separate sets of power lines 261 and 262 to enable address signals to be transmitted to all the data transponders connected to power lines 261 and 262. Moreover, reply data signals provided by such data transponders and extended over either lines 261 or 262 are returned to the control transponder converter 41 via network 260.

The coupling network 260 comprises a transformer T2 having windings 265-267. Winding 265, which is associated with the control transponder is connectable via plug 268 to the output of the receiver 46 of the control transponder 41. A portion 265' of the winding 265 is connectable via plug 269 to the output of the transmitter oscillator 44.

Winding 266 is associated with lines 261 and is connected via capacitors C9 and C10 to phase conductors 01 and 02 of the lines 261. The neutral conductor N of the lines 261 is connected to a center tap 270 of winding 266.

Similarly, winding 267 is connected over coupling capacitors C11 and C12 to phase conductors 01 and 02 of lines 262 and the neutral conductor N is connector to a center tap 274 of winding 267.

Outputs 271–273 associated with winding 266 may be hard-wired to the conductors 01, 02, N of the lines 261 or an electrical plug may be provided to enable connection to the wiring system via an electrical outlet. Likewise, output terminals 275–277 associated with winding 267 may be either hard-wired or plug connected to the lines 262.

Referring to FIG. 8, there is shown an embodiment for a signal coupling network 280 for a wiring system which provides three phase 60 Hz power signals. The network 280 includes a transformer T3 having three windings 281–283 which are individually connected over associated coupling capacitors C13–C15 to different ones of phase conductors 01–03 and the neutral conductor N. The winding 284 is associated with the control unit or data transponder. Winding 284 is connected across the receiver 46 and a portion 284' of the winding 284 is connected across the output of the transmitter 44.

Coupling network 280 enables output signals provided by the transmitter 44 to be coupled over winding 284 to each of the windings 281–283 and extended to each of the phase conductors 01–03. Accordingly, data transponder units connected to one or more of the phase conductors 01–03 via associated coupling networks are enabled to receive such address signals. Moreover, the reply data signals provided by the data transponders and extended over one or more of the phase conductors 01–03 are coupled into the receiver 46 of the control transponder 41 over the coupling network 280.

Thus, the signal coupling networks shown in FIGS. 6–8 enable the use of existing power lines 25 wherein data transponder units are connected to only certain ones of a plurality of conductors which comprise the power lines. Also, where separate wiring installations are provided for a given building complex, the coupling network 260 shown in FIG. 7 enables a data transmission link to be established between the control transponder A and all of the data transponders A1, A2, AN of the system. Since the signal coupling networks 248, 260 and 280 shown in FIGS. 6–8 are not tuned circuits, the transmitter and receiver sections of a given control or data transponder may include bandpass filter circuits to provide isolation between the transmitter and receiver sections.

While the coupling networks 260 and 280 shown in FIGS. 7 and 8, respectively, are described for use to connect the control transponder A to the power line 25, such coupling networks 260 and 280 may be used to provide data signal coupling between separate power lines within a given building complex or for coupling several data transponders to a given power line.

Transponder

The frequency modulated carrier signals generated by control unit A are transmitted over the power line 25 to all of the transponders A1, A2, AN which are connected to the power line 25. Each transponder, such as transponder A1 associated with indicating device 21, includes a converter 60 and associated control logic circuits 61.

Each converter, such as converter 60, comprises a receive section 63 including an amplifier limiter circuit 64, a demodulator 65, a pair of tone filters 66, 67 and a pair of tone detector circuits 68, 69, a transmit section 70 including an FM modulator circuit 71 and a transmitter circuit 72, and a signal coupling network 62 which couples the transmit and receive sections to the power line 25.

While in the following description the signal coupling network 62 is similar to the signal coupling network 48 shown in FIG. 3, the signal coupling networks 248, 260 or 280 shown in FIGS. 6–8 may be employed rather than network 48. However, the Pi filter network 53 which is connected between the power line 25 and the receive section 63 of the transponder A1 is tuned to a center frequency of approximately 450 KHz, the frequency of the interrogate signals provided by the control unit A. Moreover, the Pi filter network 50 which is connected between the power line and the transmit section 70 of the transponder A1 is tuned to a center frequency of approximately 500 KHz which is the frequency of signals provided by the transponder transmitter circuit 72. The capacitors C3, C4 block the 60 Hz AC signals normally present on the power line 25 from entering the transponder converter 60.

The frequency modulated signals received at the transponder A1 are extended to the demodulator circuit 65 over the signal coupling network 62 and the amplifier limiter circuit 64. The demodulator circuit 65 removes the intelligence (Fa and Fb) from the carrier F1 and provides output tones of frequencies of 2KHz (Fa) and 3KHz (Fb) representing logic 1 and logic 0 levels, respectively, in a sequence coded to represent the address of the selected indicating device 21.

The tone sequence representing the select code transmitted from control unit A is extended to the input of tone filters 66 and 67 which serve as a separation network. Tone filter 66 is tuned to detect tones of a frequency of 2KHz, and tone filter 67 is tuned to detect tones of a frequency of 3KHz. The outputs of the tone filters 66 and 67 are extended to tone detecting circuits 68 and 69, respectively, which provide outputs representing logic 1 and logic 0 levels, respectively. Thus, as indicated in line B of FIG. 2, responsive to each carrier signal modulated by a 2KHz tone, detector circuit 68 will provie an output representing a logic 1 level and responsive to each carrier signal modulated by a 3KHz tone, detector circuit 69 will provide an output representing a logic 0 level. The logic level outputs of the receive section 63 of the converter 60 are extended to the logic circuits 61 of the converter.

Logic Circuits

The logic circuits 61 include a clock circuit 74, a select code comparator circuit 75, a data register 76 and a transfer enable circuit 77.

The output of the tone detector 68 is extended to a data input 78 of the data register 76. The data register may comprise a multi-stage shift register having a number of stages equal to the number of bits that comprise the select code, which in the exemplary embodiment is eight.

Since the signal outputs of the tone detector circuits 68 and 69 are complementary, only the signal outputs of tone detector 68 are extended to the data register 76. Thus, as each bit of the select data is received and detected by the receive section 63 of transponder A1, a sequence of logic bits representing the binary coding for the address transmitted from the control unit A will be extended to the data register 76.

The outputs of the tone detectors 68 and 69 are extended to inputs 79, 80, respectively of the clock circuit 74. The clock circuit 74 has an output connected to a clock input 81 of the data register 76.

The clock circuit 74 is responsive to each logic level signal output provided by the detector circuits 68, 69, to provide a clock pulse for controlling the entry of each bit of the bit sequence representing the select code into the data register 76.

When all eight select bits have been clocked into the data register 76, the code comparator circuit 75 is effective to compare the received select or address code with an address code stored by the code comparator circuit 75.

Whenever each bit of the select code stored in the data register 76 is the same as corresponding bits of the address code stored by the code comparator circuit 75, the code comparator circuit provides enabling outputs for the data transfer circuit 77 and the transmitter circuit 72 of the transponder A1.

It is pointed out that the transmitter circuit 72 of transponder A1 is normally unenergized and the code comparator circuit 75 provides an enabling signal to effect energization of the signal transmitter 72 only when the indicating device 21 associated with such transponder is selected to be read out.

The data transfer circuit 77, when enabled by the code comparator circuit 75, is operable to effect the transfer of the logic level data signals which represent the reading of indicating device 21 from the encoder 31 to the data register 76. In the exemplary example, it is assumed that the indicating device 21 includes a two dial register providing a two digit reading and that the associated encoder 31 provides an eight bit binary coded word representing the reading of the register 21. Accordingly, the data transfer circuits 77 are responsive to the enabling signal provided by the comparator circuit 75 to effect the transfer of the eight bit word provided by the encoder into the data register 76.

Reply

After the select signals have been received at transponder A1 and the reading data has been transferred to the data register 76, the control unit A generates readout signals for effecting the readout of the data provided by indicating device 21 at the remote location. The eight bit data word stored in the data register 76 is read out bit-by-bit under the control of the control unit A. The interrogate signal generator 40 of control unit A provides a series of eight logic 1 level bits for controlling the FM modulator 43 and the transmitter oscillator 44 to provide the series of readout signals (450 KHz carrier signals modulated by 2KHz signals) shown in line A of FIG. 2.

The readout signals generated by the transmitter oscillator 44 are coupled to the power line 25 over the coupling network 48 and transmitted to all transponders A1, A2, AN connected to the power line 25. It is pointed out, however, that only transponder A1 of the selected indicating device 21 is responsive to the readout signals to enable transmission of data back to the control unit A.

Transponder Transmitting Circuits

The frequency modulated readout signals transmitted to the transponders A1, A2, AN over the power line 25 are coupled over associated coupling networks, such as coupling network 62, to the receive sections of the transponders, such as receive section 63 of transponder A1. The readout signals are passed through the amplifier limiter circuit 64 and the demodulator circuit 65 which removes the modulating tones at a frequency of 2KHz from the 450 KHz carrier signal. The 2KHz tones, representing logic 1 data bits, are extended to the tone filter 66 and tone detector 68 which provides the series of logic 1 level bits shown in line B of FIG. 2.

The logic level readout data bits thus provided are extended to the data output 78 of the shift register 76 to effect serial readout of the data stored in the data register 76 representing the reading of indicating device 21. The readout data bits provided at the output of the tone detector 68 are also extended to the clock circuit 74 which provides clock pulses for enabling the entry of such readout data bit into the input stage of the shift register 76.

As the readout bits are shifted into the data register 76 one at a time, the data bits representing the reading of the indicating device 21 are shifted out of the data register 76, providing a sequence of logic 1 and logic 0 bits coded to represent the reading.

The sequence of logic 1 and logic 0 data bits provided at the output of the data register 76 is extended to the frequency modulator circuit 71 which is responsive to each logic 1 level bit to provide modulating signals of a first frequency Fa, which may be a 2KHz, and responsive to each logic 0 level bit to provide signals of a second frequency Fb, which may be 3KHz. The modulating signals in turn control the transmitter oscillator 72 modulating the carrier frequency F2, which may be 500 KHz, provided by transmitter 72 to generate frequency modulated signals coded to represent the reading of the indicating device 21.

Thus, by way of example, assuming the reading of the indicating device 21 is 67, the transmitter 72 will provide the series of frequency modulated signals indicated on line C of FIG. 2 consisting of the transponder carrier frequency F2 modulated by signals of frequencies Fa and Fb. The reply data signals generated by the transmitter 72 are coupled to the power line 25 over the signal coupling network 62 and transmitted over the power line 25 back to the control unit A.

The reply data signals received at the control unit A are coupled over the signal coupling network 48 to the input of the receive section 49 of the control unit A.

The received signals are coupled over coupling network 48 to the amplifier limiter circuit 46 and the demodulator 47 where the modulating signals Fa, Fb are removed from the transponder carrier signal F2. The recovered signals Fa, Fb are then passed to a tone filter and detector circuit 47' which provides a logic 1 level output for each signal of frequency Fa and a logic 0 level output for each signal of frequency Fb. The output of the receiver section 49 of the control unit A, shown in line D of FIG. 2 comprises a sequence of logic level signals representing the binary coding for the reading 67 of indicating device 21. The binary coded reading data is passed to the data receiver circuit 42 of the control unit A where the received data is stored.

Alternate Embodiment

The readout of the indicating devices 21-23 of the system 20 shown in FIG. 1, as well as the readout of a plurality of groups of other indicating devices at a plurality of other locations, can be controlled from a central interrogate station. Thus, referring to FIG. 4, an interrogate unit 120 at a central interrogate station provides interrogate signals for transmission to the locations of indicating devices 21-23 which may be associated with equipment in a first building A and further interrogate signals for transmission to the location of other indicating devices 121-123 which may be associated with equipment in a second building B at a location remote from the first building A.

Figure 4:
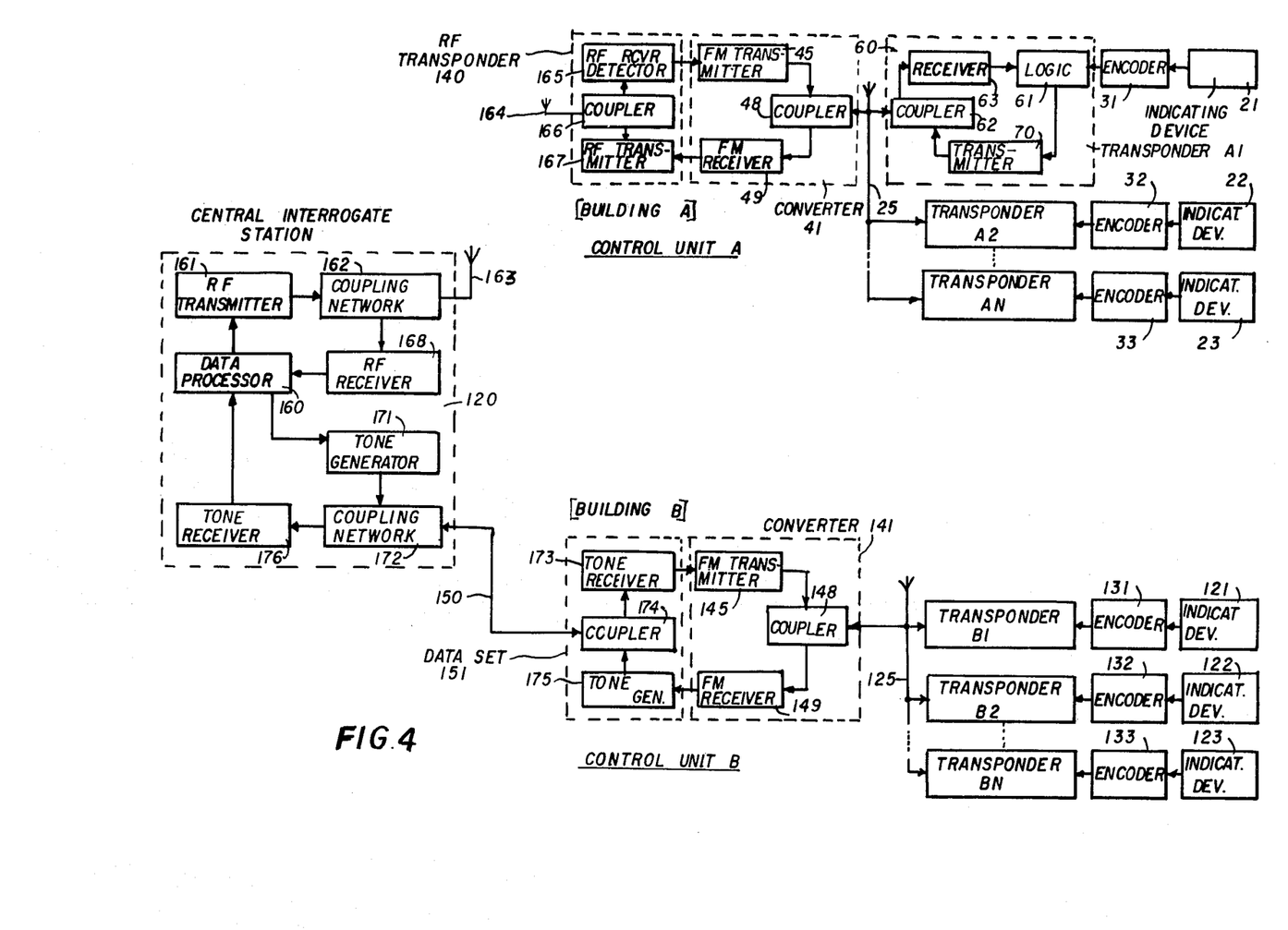
FIG. 4 is a block diagram of a system for providing remote readout of a plurality of groups of indicating devices from a central location.

The interrogate signals transmitted to the location of indicating devices 21-23, 121-123 are received at respective control units A, B and transmitted to corresponding transponders A1, A2, AN, or B1, B2, BN over existing electrical power lines 25, 125 of the buildings within which the indicating devices 21-23, 121-123 are located.

The control units, such as control unit A, serve as exit data transponders operable to transmit the reading data provided by each of the indicating devices 21-23 at a plurality of different locations in the building A to the central interrogate station from a single control location in the building A.

The interrogate signals provided by the interrogate unit 120 may be transmitted to a control unit associated with a group of indicating devices via an RF communication link established between the interrogate unit 120 and a control unit, such as control unit A. Alternatively, the interrogate signals may be transmitted over a direct communication link established over a telephone line 150 connected between the interrogate unit 120 and a control unit, such as control unit B.

Figure 4A:
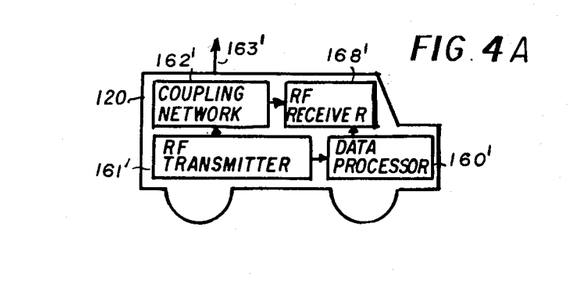
FIG. 4a is a schematic representation of a mobile interrogate unit for use with the system shown in FIG. 4.

Thus, in one arrangement for controlling the readout of indicating devices 21-23 associated with control unit A, the interrogate unit 120 includes an RF transmitter 161 controlled by the data processing unit 160 to generate RF interrogate signals, including select signals coded to represent the address of one of the indicating devices 21-23 selected to be read out, and readout signals for effecting the readout of the reply data provided by the selected indicating device. The interrogate signals are coupled over a coupling network 162 to an antenna 163 of the interrogate unit 120 for transmission to the location of the control unit A. It is pointed out that the interrogate unit 120 may be a mobile unit, such as mobile interrogate unit 120' shown in FIG. 4a, which is driven in the vicinity of the buildings, such as building A, in which the data indicating devices 21-23 are located.

Control unit A includes an RF transponder 140 having an antenna 164 for receiving the interrogate signals transmitted from the interrogate unit 120. The received RF signals are coupled over a coupling network 166 to a receiver-detector circuit 165 of the transponder 140. The receiver-detector circuit 165 converts the RF signals into a series of data pulses coded to represent the select and readout data.

The control unit A further includes a converter 41 having an FM transmitter 45 which converts the data pulses provided by the RF transponder 140 into frequency modulated signals for transmission over the electrical power line 25 of building A to the transponders A1, A2, AN connected to the power line 25. In addition, the converter 41 of control unit A includes an FM receiver 49 which receives frequency modulated reply signals provided by the transponder of a selected indicating device and converts such received signals into data pulses representing the reading of a selected indicating device. The operation of the converter 41 has been set forth in the foregoing description with reference to FIG. 1.

The reply data pulses are passed to the RF transponder 140 which further includes an RF transmitter 167 which is responsive to the logic level pulses to generate RF reply signals coded to represent reading of the selected indicating device for transmission to the central interrogate station 120.

The central interrogate station 120 further includes an RF receiver 168 which receives the RF reply signals and converts the received signals to logic level data for processing by the data processor 160 of the interrogate unit 120.

One RF system for transmitting RF interrogate signals from a central location to a remote location for effecting the readout of a plurality of data indicating devices is described in the copending application of James E. Batz, U.S. Ser. No. 883,890, filed Dec. 10, 1969. The mobile unit shown in the reference application could serve as a mobile unit 120' shown in FIG. 4a, and the transponder of the previous application could be used as the RF transponder 140 in the system of the present invention with the signal outputs of the tone detector 50 being used to control the FM transmitter 45 shown in FIG. 5 and reply data being transmitted by a locked oscillator and quenching modulator such as are shown in the referenced application.

Alternatively, in a second arrangement for controlling the readout of indicating devices 121 – 123 associated with the control unit B, interrogate unit 120 may be connected directly to control unit B at a remote location over a telephone line 150. In such application, the interrogate unit 120 includes a tone generator 171 which is controlled by the data processor 160 to generate multi-frequency tone signals coded to represent the address of a selected indicating device and readout signals for effecting the readout of the selected indicating device. The multi-frequency select and readout signals are coupled to the telephone line 150 over a coupling network 172 for transmission to the location of control unit B.

Control unit B includes a tone receiving unit which may comprise a data set 151 which includes a tone receiver 173 which receives multi-frequency signals coupled thereto over line coupling network 174 from the communication line 150 and converts the multi-frequency signals into binary coded pulses representing the select and readout data.

Control unit B also includes a converter 141 which is similar to converter 41 of control unit A. Converter 141 converts the binary pulses provided by the data set 151 into frequency modulated signals representing the select and readout data. Converter 141 is connected to power line 125 to enable the frequency modulated signals provided by the converter 141 to be transmitted over power line 125 to the transponders B1, B2, BN which are connected to power line 125. Whenever one of the indicating devices 121-123, such as indicating device 121, is selected to be read out, the associated transponder B1 is responsive to the select and readout signals present on line 125 to provide frequency modulated reply data signals representing the reading of the selected indicating device 121.

The frequency modulated reply signals generated by transponder B1 are transmitted over power line 125 to converter 141 of control unit B which converts the frequency modulated signals to a train of data pulses representing the reading indicated by the reply data received. The data pulses are passed to a tone generator 175 of data set 151 for controlling the tone generator 175 to effect the generation of multi-frequency signals which are coded to represent the reading of indicating device 121. The multi-frequency signals thus generated are coupled to the communication line 150 over the line coupling network 174 and are transmitted back to the interrogate unit 120 at the central interrogate station.

The central interrogate unit 120 further includes a multi-frequency tone receiver 176 which receives signals coupled thereto from the communication line 150 over coupling network 172. The tone receiver 176 converts the multi-frequency tones into logic level pulses which are passed to the data processing unit 160.

We claim:

1. In a system which employs AC electrical power lines for effecting selective readout of information registered on a plurality of register means, each of which is associated with a different one of a plurality of utility devices located within an electrically wired building complex having electrical power distribution conductors which are connected over a power distribution box and a service main for said complex to said power lines and which extend to a plurality of locations within said complex and supply power to standard electrical receptacles connected to said electrical power distribution conductors, certain ones of said electrical receptacles being located in the vicinity of the utility devices, each of said utility devices having plug means for connecting the utility device to one of the electrical receptacles for supplying power to the utility devices, while permitting convenient relocation of the utility devices, the improvement comprising an individual data transponder means for each of said register means for each utility device, each data transponder means including transmitter means operable when enabled to generate data signals which represent the information provided by an associated register means, and a power cord having an electrical plug adapted to be plugged into one of said electrical receptacles to connect said data transponder means to said power distribution conductors in said building complex to enable said data signals to be conducted over said power cord to said power distribution conductors, and a control transponder means coupled to the power distribution conductors for said building complex, including means responsive to interrogate signals provided by an interrogate means located externally of said building complex to provide enabling signals for transmission over the electrical power distribution conductors in said building complex to said transmitter means, and receiver means in said control transponder means including means for receiving said data signals which are transmitted over said building complex power distribution conductors by each of the plurality of data transmitters and means for transmitting the information to said interrogate means over a communication link which effectively bypasses said power distribution box and said service main.

2. In a data acquisition system including interrogate means for accumulating information which has been registered on a plurality of mechanical register means at different locations in a building complex using existing electrical power distribution conductors of the building complex which extend from a service entrance to a plurality of locations within the complex and supply power to standard electrical receptacles connected thereto, each of the mechanical register means being associated with a different one of a plurality of utility devices located within the building complex, each of the utility devices having plug means for connecting the utility device to a convenient one of the electrical receptacles for supplying power to the utility devices, while permitting convenient relocation of the utility devices, the improvement comprising a plurality of data transmitters each individually associated with a different one of said mechanical register means, each of said data transmitters including encoder means for encoding the information registered by an associated register means into digital data, a power cord having an electrical plug adapted to be plugged into one of said standard electrical receptacles in the proximity of the utility device with which the data transmitter is used, a control transponder coupled to the power distribution conductors in said building complex and including means for initiating the transmission of said digital over said power cord to said building complex power distribution conductors, and receiver means having a power cord with an electrical plug adapted to be plugged into one of said electrical receptacles for connecting said receiver means to said electrical power distribution conductors in said building complex to receive said digital data as transmitted by the plurality of data transmitters in the system, said interrogate means being located externally of said building complex, and said control transponder including means for transmitting said data to said interrogate means over a communication link which effectively bypasses said service entrance.

3. In a data acquisition system including data accumulating means for accumulating information which has been registered on a plurality of mechanical register means associated with utility devices at different locations in a building complex using the existing electrical power distribution conductors in the building complex which extend from a service entrance for said building complex to supply power to electrical receptacles connected to said power distribution conductors at different locations in the building, the improvement comprising a plurality of data transponders, each of which is connected to a different one of said mechanical register means, each of said data transponders including encoder means for encoding the information registered by an associated register means into digital data, and transmitter means controlled by said encoder means to provide data signals representing said digital data at a data output thereof, each of said data transponders having a power cord with a plug adapted to be plugged into any of said electrical receptacles for connecting the data output of said transmitter means to said building complex power distribution conductors to enable said data signals to be conducted over said power cord to said building complex power distribution conductors, and a control transponder connected to said building complex power distribution conductors including receiver means to receive said digital data as transmitted by the plurality of data transponders in the system, said data accumulating means being located externally of said building complex and said control transponder including means for transmitting said digital data to said data accumulating means over a communication link which effectively bypasses said service entrance.

4. A system as set forth in claim 3 wherein said control transponder has a power cord with an electrical plug for connecting said control transponder to said electrical power distribution conductors over one of said electrical receptacles.

5. A system as set forth in claim 3 which includes means in said control transponder means responsive to interrogate signals provided by said data accumulating means for initiating the readout of each of said transmitter means over the power distribution conductors in said building.

6. A system as set forth in claim 3 wherein said communication link is an RF link, and wherein said data accumulating means is contained within a mobile unit.

* * * * *

UNITED STATES PATENT OFFICE
CERTIFICATE OF CORRECTION

Patent No. 4,040,046   Dated August 2, 1977

Inventor(s) George Long, Dennis J. Martell and James E. Batz

It is certified that error appears in the above-identified patent and that said Letters Patent are hereby corrected as shown below:

Column 16, line 25, after "digital" insert -- data --.

Signed and Sealed this

Third Day of January 1978

[SEAL]

Attest:

RUTH C. MASON
*Attesting Officer*

LUTRELLE F. PARKER
*Acting Commissioner of Patents and Trademarks*